(12) United States Patent
Haszler et al.

(10) Patent No.: US 6,495,269 B1
(45) Date of Patent: Dec. 17, 2002

(54) MULTILAYER METAL COMPOSITE PRODUCTS OBTAINED BY COMPOUND STRAND CASTING

(75) Inventors: Alfred Johann Peter Haszler, Vallendar (DE); Dietmar Franz Brandner, Mayen (DE)

(73) Assignee: Corus Aluminium Walzprodukte GmbH, Koblenz (DE)

( * ) Notice: Subject to any disclaimer, the term of this patent is extended or adjusted under 35 U.S.C. 154(b) by 0 days.

(21) Appl. No.: 09/319,191

(22) PCT Filed: Dec. 1, 1997

(86) PCT No.: PCT/EP97/06951

§ 371 (c)(1),
(2), (4) Date: Aug. 20, 1999

(87) PCT Pub. No.: WO98/24571

PCT Pub. Date: Jun. 11, 1998

(30) Foreign Application Priority Data

Dec. 3, 1996 (EP) ............................................. 96203429

(51) Int. Cl.$^7$ ......................... B32B 15/01; B32B 15/20; B22D 19/16
(52) U.S. Cl. ........................ 428/610; 428/615; 428/654; 164/96; 228/235.2
(58) Field of Search ................................. 428/615, 654, 428/610; 228/235.2, 262.51, 262.5; 164/96

(56) References Cited

U.S. PATENT DOCUMENTS

| | | | | |
|---|---|---|---|---|
| 397,928 A | * | 2/1889 | Melaney | 164/96 |
| 2,171,229 A | * | 8/1939 | Steiner | 164/96 |
| 2,821,014 A | | 1/1958 | Miller | 29/197.5 |
| 3,206,808 A | * | 9/1965 | Robinson | 164/96 |
| 3,295,174 A | * | 1/1967 | Webber et al. | 164/96 |
| 4,566,524 A | | 1/1986 | Chia et al. | 164/461 |
| 4,567,936 A | | 2/1986 | Binczewski | 164/453 |
| 5,226,953 A | * | 7/1993 | Hodes et al. | 164/95 |
| 5,476,725 A | * | 12/1995 | Papich et al. | 164/461 |

FOREIGN PATENT DOCUMENTS

| | | | |
|---|---|---|---|
| DE | 4420697 | 12/1995 | |
| EP | 326337 | 8/1989 | |
| JP | 60-96359 | * 5/1985 | 164/96 |
| WO | 9413472 | 6/1994 | |

OTHER PUBLICATIONS

Patent Abstracts of Japan, vol. 5, No. 166 (M–093), Oct. 23, 1981 for JP 56091970.

* cited by examiner

Primary Examiner—John J. Zimmerman
(74) Attorney, Agent, or Firm—Stevens, Davis, Miller & Mosher, LLP

(57) ABSTRACT

A metallurgical product, such as brazing sheet, comprises a core, on at least one side of the core an interlayer bonded to the core and a cladding bonded to the interlayer. The core and the interlayer are a compositely cast material having at their mutual interface a bond formed in a casting process by their simultaneous solidification from contacting melts of their respective materials. This provides a simple process, with good adhesion. The cladding is applied subsequently and the composite material is rolled into a sheet or plate product.

41 Claims, No Drawings

MULTILAYER METAL COMPOSITE PRODUCTS OBTAINED BY COMPOUND STRAND CASTING

FIELD OF THE INVENTION

The invention relates to a metallurgical product comprising a core, on at least one side of the core an interlayer bonded to the core and a cladding bonded to the interlayer, and to a method of producing such a metallurgical product. Particularly but not exclusively, the invention relates to such a metallurgical product in the form of a brazing sheet or a brazing plate, and also to a brazed assembly including the metallurgical product as at least one component.

DESCRIPTION OF THE PRIOR ART

A metallurgical product comprising a core alloy with on at least one side an interlayer and at least one cladding layer, which is bonded to the interlayer has been obtained by roll cladding the different layers together. U.S. Pat. No. 2,821,014 typically describes this method and product. A disadvantage of roll cladding is the handling and processing, e.g. rolling and surface treatment, of all the different types of layers. Consequently roll cladding is time consuming and is expensive.

Direct adhesion of clad layers to a core layer to make brazing sheet by rolling is also known, e.g. from EP-A-326337.

U.S. Pat. No. 5,476,725 describes a method of manufacture of a composite brazing product having an aluminium core and at least one clad layer. The clad layer or layers in band form are fed to opposed cooled rolls simultaneously with molten core material, which is solidified in contact with the clad layer or layers. It is stated that, despite the fact that the clad layer melts at a lower temperature than the core, it does not melt when it contacts the molten core material in the roll bite. Subsequently the composite is cold-rolled. In one variant of the method, interlayers of zinc are thermally sprayed onto the clad bands as they are unwound from coils prior to the contact of the bands with the molten core material. A similar process is described in JP-A-56-091970.

JP-A-61-111745 describes a method of making a material intended for brazing to another member to provide a corrosion and wear resistant layer. Brazing metal is solidified as a band on one roll of a pair of rolls, and a second molten metal in the form of a Co alloy containing ceramic fibres is solidified onto the band at the nip of the two rolls.

Some further prior art relating generally to casting processes is discussed below.

SUMMARY OF THE INVENTION

An object of the invention is to provide a metallurgical product of the type described above which can be produced at lower costs compared to the existing products.

According to the invention in a first aspect there is provided a metallurgical product comprising a core, on at least one side of the core an interlayer bonded to the core and a cladding bonded to the interlayer, characterized in that said core and interlayer are a compositely cast material having at their mutual interface a bond formed by their simultaneous solidification from contacting melts of their respective materials in a casting process.

According to the invention in a second aspect there is provided a metallurgical product comprising a core, on at least one side of the core an interlayer bonded to the core and a cladding bonded to the interlayer, characterized in that said core and interlayer are a compositely cast material having at their mutual interface a bonding zone formed by mutual mixing of their respective compositions in the molten state prior to their solidification in a casting process.

The metallurgical product in accordance with this invention is therefore characterized in that the core and the interlayer are bonded in a casting process in which the core and the interlayer are solidified simultaneously from the molten state as to form a composite material. Subsequently, the clad layer is applied. The core alloy and the interlayer alloy are simultaneously solidified from the molten state during a continuous or semicontinuous casting process in such a manner that the obtained solidified core is covered at least on one side, and preferably on the whole outer surface, with the interlayer alloy so as to form a compositely cast material. Such a compositely cast material is obtained at significant lower costs than a conventional roll clad composite material, because scalping of the core alloy and the steps of casting, rolling and surface treatment of the interlayer prior to bonding onto the core are no longer required.

A further advantage of the invention is the excellent strong bonding of the interlayer and the core, due to their simultaneous solidification in contact with each other. This contact of the two molten materials with consequent mixing at their interface produces in the solidified product a narrow interface bonding zone which has a metallurgical nature characteristic of the product and method of this invention. Such an interface bonding zone is readily recognizable by the expert in the product, and is different from and distinguishable from the prior art products described above in which one or both of two layers is solid prior to the bonding.

In the metallurgical product in accordance with the invention, when in plate or sheet form, at least on one side of the core the interlayer thickness is preferably 1–30% of the thickness of the compositely cast material. In the case of a product of the invention in the form of a bar, rod or wire, the interlayer is likewise preferably 1–30% of the radius (half width) of the compositely cast material. This allows for a great flexibility in thickness of the interlayer, this flexibility being significantly larger compared to roll cladding.

It is an advantage obtainable with the invention that the core and the interlayer are essentially free from oxides at their interface. An important advantage of such a compositely cast material compared to roll bonded material is the improved bonding between the core and the interlayer due to the absence of oxides or oxide-compounds at their interface. Such compounds can be present in roll bonded material even after proper surface treatment prior to roll bonding.

In the metallurgical product in accordance with the invention the cladding may have a solidus temperature different from that of the core and more preferably the cladding has a solidus temperature lower than that of the core. The metallurgical product in these cases embodiments is very suitable for brazing sheet applications.

While the invention is in principle applicable to a wide range of metals, preferably the core is an aluminium alloy, which makes the product suitable for a wide range of applications, e.g. brazing sheet. Depending on the required final properties for the application or use of the metallurgical product, one may select a heat treatable aluminium alloy as the core alloy, e.g. AA2xxx, AA6xxx or AA7xxx-series alloys, or a non-heat treatable aluminium alloy, e.g. AA3xxx or AA5xxx-series alloys.

When the cladding is a brazing alloy, preferably it is an aluminium brazing alloy. Depending on the final use or application of the metallurgical product of the invention, also another cladding can be applied, e.g. AA1xxx-series alloys to obtain a mirror like surface finish, or the application of zinc or a zinc alloy or a zinc containing aluminium alloy to improve corrosion resistance.

Preferably the interlayer has a corrosion potential different from that of the core, and more preferably lower than that of the core. In this case the interlayer acts as an anodic interlayer and improves the corrosion resistance of the metallurgical product. Depending on the type of core alloy and the application or use of the metallurgical product one may prefer an interlayer comprising a heat treatable aluminium alloy, e.g. AA2xxx, AA6xxx or AA7xxx-series alloys, or an interlayer comprising non-heat treatable aluminium alloys, e.g. AA1xxx, AA3xxx or AA5xxx-series alloys. Alternatively the use of zinc or a zinc alloy or a zinc-containing aluminium alloy is possible.

Preferably the interlayer constitutes, in known manner, a diffusion barrier between the cladding and the core. In this case the interlayer shields the core material from elements coming from the molten brazing alloy during brazing and vice versa. Depending on the type of core alloy and the application or use of the metallurgical product, one may prefer an interlayer AA6xxx or AA7xxx-series alloys, or one may prefer an interlayer comprising a non-heat treatable aluminium alloy, e.g. AA1xxx, AA3xxx or AA5xxx-series alloys. See U.S. Pat. No. 2,821,014 for further information concerning barrier liners for use in the present invention.

Another object of this invention is to provide a method for producing the metallurgical product of the invention.

The method in accordance with this invention comprises the steps of
  (i) preparing the compositely cast material comprising the core and the interlayer bonded to the core by a process including casting the core and the interlayer in such a manner that their respective melts solidify simultaneously in contact with each other, and
  (ii) bonding the cladding to said interlayer after solidification of said interlayer.

An advantage of this method is that the core and the interlayer are bonded together in one process step, avoiding the need for rolling a plate of the interlayer material and surface treatments of the core and the interlayer material. In this way significant process cost benefits are obtained. Another advantage of the method according to the invention is the flexibility of choice of the core alloy. Non-conventional core alloys can be processed, e.g. high strength AA7xxx-series alloys having a functional interlayer between the cladding and the core.

Any suitable casting process, particularly continuous and semi-continuous casting processes can be used in the method of the invention to form the compositely cast materials, e.g. the casting techniques or processes known from the patent publications EP-A-0596134 and DE-A-4420697. It is mentioned here for completeness of prior art disclosure that many other combined casting techniques in which two metals are solidified are known. Examples are those of DE-A-844806, U.S. Pat. No. 4,567,936, GB-A-2204518 and EP-A-596134, but these do not involve simultaneous solidification of two molten metals in contact.

More preferably a DC-casting process or modification thereof is used, e.g. that of DE-A-4420697, because in this way the method can be applied at existing casting stations without the need for significant cost investments for a new casting machine and required infrastructures, both for ingots and extrusion billets.

In a preferred method of the invention the thickness of the compositely cast material after casting is more than 100 mm, and in the case of an extrusion billet the diameter of the composite material is more than 100 mm, although smaller diameter billets can be produced in the way ("extrusion billet" is a term used in the art to describe typically a cylindrical product which may be subjected to extrusion, though in the present invention a different subsequent treatment such as rolling may be employed). This allows for the production of the composite material using conventional DC-casting techniques or small modifications thereof. Further cost reductions are achieved in this way.

The bonding between the cladding and the interlayer can be obtained using the conventional roll cladding technique or modifications thereof. However, also other techniques like dipping, thermal spraying or arc spraying the cladding onto the interlayer may be used.

Background information on plating, coating, and surface treatment may be found in the following two resources and in the references cited in their bibliographies:
  (1) Metals Handbook, 9th edition, Vol. 5, "Surface Cleaning, Finishing and Coating", American Society for Metals (ASM), Metals Park, Ohio (1982); and
  (2) ASM Handbook, Vol. 18, "Friction, Lubrication and Wear Technology", ASM International, Metals Park, Ohio (1992).

Among the various options of plating, coating and surface treatment, roll cladding is preferred for plate and/or sheet products of the present invention.

In the method of the invention it is preferred that the compositely cast material is homogenized, and preferably homogenized prior to step (ii). Depending on the type of alloy chosen for the core and the interlayer, homogenization may be required to enhance processing of the composite material for instance to improve formability during rolling. Homogenization is a known process step performed to reduce residual stresses from casting and reduce microsegregation of alloying elements.

Preferably the compositely cast material is hot rolled prior to step (ii). Depending on the thickness required of the compositely cast material it may be rolled, and more preferably hot rolled, prior to the cladding. Preferably the compositely cast material is homogenized prior to hot rolling.

The compositely cast material is typically surface treated prior to step (ii). By surface treating, e.g. scalping, chemical etching and many other possible treatments or combinations thereof, the bonding between the interlayer and the cladding may be improved.

The method may further include a step (iii) of rolling the product into a sheet product or plate product. Heat treatments at any stage during or after rolling may also be applied to obtain the required final properties of the plate or sheet product or may be applied to enhance processing during rolling.

The invention further relates to a sheet product obtained from processing the metallurgical product according to the invention or obtained from the method according to the invention, wherein the sheet product has a thickness of less than 3 mm and more preferably less than 2 mm. More in particular the invention also relates to a sheet product obtained from processing the metallurgical product according to the invention or obtained from the method according to the invention, wherein the sheet product is brazing sheet. Using the metallurgical product according to the invention a wide variety of possible combinations of core, interlayer and cladding can be obtained which are very suitable for brazing sheet and brazing sheet applications. For example the cladding comprises Si in a range of 3–18 weight %, or comprises an aluminium alloy originating from the AA4xxx-series alloys.

Further the invention relates to a plate product obtained from processing the metallurgical product according to the invention or obtained from the method according to the invention, wherein the plate product has a thickness in a range of 3–8 mm.

The invention also relates to the use of the metallurgical product according to the invention or obtained from the method according to the invention as brazing sheet, e.g. as part of an assembly and bonding the assembly together. Or for use as part of an assembly and bonding the assembly together by heating the assembly above the solidus temperature of the cladding. Or as part of an assembly comprising a heat exchanger of tube and fin or plate and fin construction kept in heat exchanging relationship by mechanical connection. Or for use as part of an assembly comprising a heat exchanger of tube and fin or plate and fin construction kept in yet another example for suitable use is as part of an assembly comprising a heat exchanger or tube and fin or plate and fin construction kept in heat exchanging relationship by the molten cladding.

EXAMPLE

On a pilot scale in a test the following multi-layer product was produced.

A billet with a length of about 1500 mm and a total diameter of 255 mm was cast using the casting technique of DE-A-4420697, with simultaneous solidification of core and interlayer while their respective melts are in contact. The diameter of the core was 221 mm and the remainder was the interlayer. The core alloy has a chemical composition within the AA6063 range and the interlayer was within AA3003 range with a further addition of 1.3 wt. % zinc. The cast composite billet was cut lengthwise into sections of 500 mm. The sections were homogenized for 8–12 hours at 560–580° C. with a heat-up and cooling rate of about 35° C./hour. The sections were hot-rolled into a rectangular shape of required thickness. Alternatively forging might be applied. The interlayer was scalped in order to obtain the required thickness of the layer in the final thickness. The scalped section was roll clad with a cladding on the interlayer on one side only. The cladding material was within the AA4004 range. The multilayer product was hot rolled down to 3.5 mm and further cold rolled to 0.35 mm. During cold rolling an interanneal was applied at a temperature of 360° C. The final multilayer sheet product has a thickness of 0.35 mm of which about 10% is the clad layer and 35–45 $\mu$m is the interlayer. The multilayer brazing sheet product was tested in a SWAAT-test in accordance with ASTM G-85 and had a corrosion life of more than 25 days without perforations. This is a similar test result compared with multilayer brazing sheet obtained by conventional roll cladding of similar composition and thickness of the different layers.

In this manner a multilayer product is obtained that has the following advantages:

has corrosion and mechanical properties similar to that of conventional roll clad material;

has a great flexibility in alloy composition;

can be produced at existing production facilities;

is produced at lower cost;

has an improved bonding between the core and the interface layer.

What is claimed is:

1. A metallurgical product comprising a core, on at least one side of the core an interlayer bonded to the core and a cladding bonded to the interlayer, wherein said core and interlayer are a compositely cast material having at their mutual interface a bonding zone formed by mutual mixing of their respective compositions in the molten state prior to their solidification in a casting process.

2. A metallurgical product according to claim 1, which is plate or sheet and in which, on at least one side of said core, said interlayer has, in the thickness direction of said plate or sheet, a thickness in the range 1 to 30% of the thickness of said compositely cast material.

3. A metallurgical product according to claim 1, wherein said the shape of said product is selected from the group consisting of a bar, a rod and a wire, and in the section transverse to the length direction of said shape said interlayer has a thickness which is in the range 1 to 30% of the radius of said compositely cast material.

4. A metallurgical product according to claim 1, wherein the core and the interlayer are essentially free from oxides at their interface.

5. A metallurgical product according to claim 1, wherein the cladding has a solidus temperature different from that of the core.

6. A metallurgical product according to claim 5, wherein the cladding has a solidus temperature lower than that of the core.

7. A metallurgical product according to claim 5, wherein the cladding is a brazing alloy.

8. A metallurgical product according to claim 7, wherein the cladding is an aluminium brazing alloy.

9. A metallurgical product according to claim 1, wherein the core is an aluminium alloy.

10. A metallurgical product according to claim 9, wherein the core comprises a heat treatable aluminium alloy.

11. A metallurgical product according to claim 10, wherein the core comprises a non-heat treatable aluminium alloy.

12. A metallurgical product according to claim 1, wherein the interlayer has a corrosion potential different from that of the core.

13. A metallurgical product according to claim 1, wherein the interlayer has a corrosion potential lower than that of the core.

14. A metallurgical product according to claim 1, wherein the interlayer acts as a diffusion barrier between the cladding and the core.

15. A metallurgical product according to claim 12, wherein the interlayer comprises a heat treatable aluminium alloy.

16. A metallurgical product according to claim 12, wherein the interlayer comprises a non-heat treatable aluminium alloy.

17. A metallurgical product according to claim 1, in the form of sheet or plate.

18. A method of producing a metallurgical product according to claim 1, comprising the steps of
   (i) preparing said compositely cast material comprising said core and said interlayer by a process including casting said core and said interlayer in such a manner that their respective melts solidify simultaneously and in contact with each other, and
   (ii) bonding said cladding to said interlayer after solidification of said interlayer.

19. A method according to claim 18, wherein, after casting, said compositely cast material has a thickness of at least 100 mm.

20. A method according to claim 18, wherein said compositely cast material is subjected to a homogenization heat treatment prior to step (ii).

21. A method according to claim 18, wherein said compositely cast material is hot rolled prior to step (ii).

22. A method according to claim 18, wherein said compositely cast material is subjected to a surface treatment prior to step (ii).

23. A method according to claim 18, wherein after step (ii), the product is rolled into a sheet or plate product.

24. A metallurgical product according to claim 1 in the form of a sheet product of a thickness less than 3 mm.

25. A metallurgical product according to claim 1, in the form of brazing sheet.

26. A metallurgical product according to claim 25, wherein said cladding comprises an aluminium alloy having a Si content in the range 3 to 18 weight %.

27. A metallurgical product according to claim 1 in the form of a plate product having a thickness in the range 3 to 8 mm.

28. A brazed assembly comprising at least one component which is a metallurgical product according to claim 1.

29. A method of producing a metallurgical product according to claim 3, comprising the steps of
   (i) preparing said compositely cast material comprising said core and said interlayer bonded to said core by a process including casting said core and said interlayer in such a manner that their respective melts solidify simultaneously and in contact with each other, and
   (ii) bonding said cladding to said interlayer after solidification of said interlayer.

30. A method of producing a metallurgical product according to claim 18, comprising the steps of
   (i) preparing said compositely cast material comprising said core and said interlayer bonded to said core by a process including casting said core and said interlayer in such a manner that their respective melts solidify simultaneously and in contact with each other, and
   (ii) bonding said cladding to said interlayer after solidification of said interlayer.

31. A brazed assembly comprising at least one component which is a metallurgical product according to claim 1.

32. A brazed assembly comprising at least one component which is a metallurgical product according to claim 17.

33. A metallurgical product according to claim 1, wherein said core and said interlayer comprise a continuous or semi-continuous cast product.

34. A metallurgical product according to claim 17, wherein said core and said interlayer comprise a continuous or semi-continuous cast product.

35. A method according to claim 18, wherein said preparing comprises continuous or semi-continuous casting of the core and the interlayer.

36. A metallurgical product according to claim 2, wherein said interface between said core and said interlayer is free of oxides and oxide-compounds.

37. A metallurgical product according to claim 17, wherein said interface between said core and said interlayer is free of oxides and oxide-compounds.

38. A metallurgical product according to claim 1, wherein said interlayer comprises an anodic interlayer.

39. A metallurgical product according to claim 17, wherein said interlayer comprises an anodic interlayer.

40. A method according to claim 18, wherein the interlayer comprises an anodic interlayer.

41. A method according to claim 18, wherein said bonding zone forms by mutual mixing of the respective compositions of the core and interlayer at their mutual interface in the molten stat prior to their solidification.

* * * * *